US005726448A

United States Patent [19]

Smith et al.

[11] Patent Number: 5,726,448

[45] Date of Patent: Mar. 10, 1998

[54] ROTATING FIELD MASS AND VELOCITY ANALYZER

[75] Inventors: Steven Joel Smith, Alhambra; Ara Chutjian, La Crescenta, both of Calif.

[73] Assignee: California Institute of Technology, Pasadena, Calif.

[21] Appl. No.: 803,331

[22] Filed: Feb. 21, 1997

Related U.S. Application Data

[63] Continuation of Ser. No. 694,850, Aug. 9, 1996, abandoned.

[51] Int. Cl.[6] .......... B01D 59/44

[52] U.S. Cl. .......... 290/270; 250/295

[58] Field of Search .......... 250/290, 291, 250/292, 293, 294, 295

[56] References Cited

U.S. PATENT DOCUMENTS

| | | | |
|---|---|---|---|
| 4,221,964 | 9/1980 | Schlereth et al. | 250/290 |
| 5,495,108 | 2/1996 | Apffel, Jr. et al. | 250/288 |

FOREIGN PATENT DOCUMENTS

| | | |
|---|---|---|
| WO 95/00237 | 1/1995 | WIPO . |
| WO 95/23018 | 8/1995 | WIPO . |

OTHER PUBLICATIONS

Alber, G.M. and Marshall, A.G. Fourier Transform Ion Cyclotron Resonance of Highly-charged Atomic Ions. Physica Scripta, vol. 46, pp. 598–602, 1992.

Campbell, Victoria, Guan, Ziqiang, Vartanian, Victor H. and Laude, David A. Cell Geometry Considerations for the Fourier Transform Ion Cyclotron Resonance Mass Spectrometry Remeasurement Experiment. Anal. Chem., vol. 67, pp. 514–518, 1991.

Caravatti, P. and Allemann, M. The 'Infinity Cell': a new Trapper-ion Cell With Radiofrequency Covered Trapping Electrodes for Fourier Transform Ion Cyclotron Resonance Mass Spectrometry. Organic Mass Spectrometry, vol. 26, pp. 514–518, 1991.

Grosshans, Peter B. and Shields, Patrick J. Comprehensive theory of the fourier transform ion cyclotron resonance signal for all ion trap geometries. J. Chemical Physics, vol. 94(8), Apr. 15, 1991.

Grosshans, Peter B., Chen, Ruidan, Limbach, Patrick A. and Marshall, Alan G. Linear excitation and detection in Fourier transform ion cyclotron resonance mass spectrometry. International Journal of Mass Spectrometry and Ion Process, vol. 139, pp. 169–189, 1994.

Guan, Shenheng, Gorshkov, Michael V., Marshall, Alan G. Ciculárly polarized quadrature excitation for Fourier-transform ion cyclotron resonance mass spectometry. Chemical Physical Letters, vol. 198, No. 1, 2, pp. 143–148, 1992.

Guan, Shenheng and Marshall, Alan G. Filar ion cyclotron resonance ion trap: Spatially multiplexed dipolar and quadrupolar excitation for simultaneous ion axialization and detection. Rev. Sci. Instru., vol. 66(1), pp. 63–66, Jan. 1995.

Hatakeyama, Rikizo, Sato, Naoyuki and Sato, Noriyoshi. An efficient mass separation by using traveling waves with ion cyclotron frequencies. Nuclear Instruments and Methods in Physics Research, vol. B70, pp. 21–25, 1992.

(List continued on next page.)

*Primary Examiner*—Kiet T. Nguyen
*Attorney, Agent, or Firm*—Michaelson & Wallace

[57] ABSTRACT

A rotating field mass and velocity analyzer having a cell with four walls, time dependent RF potentials that are applied to each wall, and a detector. The time dependent RF potentials create an RF field in the cell which effectively rotates within the cell. An ion beam is accelerated into the cell and the rotating RF field disperses the incident ion beam according to the mass-to-charge (m/e) ratio and velocity distribution present in the ion beam. The ions of the beam either collide with the ion detector or deflect away from the ion detector, depending on the m/e, RF amplitude, and RF frequency. The detector counts the incident ions to determine the m/e and velocity distribution in the ion beam.

24 Claims, 7 Drawing Sheets

OTHER PUBLICATIONS

Hiroki, s., T. Abe and Murakami Y. Influence of the fringing field length on the separated $^4He/D^2$ peak shape of a high-resolution quadrupole mass spectrometer. International Journal of Mass Spectrometry and Ion Processes, vol. 136, pp. 85–89, 1994.

Limbach, Patrick L., Grosshans, Peter B. and Marshall, Alan G. Harmonic enhancement of a detected ion cyclotron resonance signal by use of segmented detection electrodes. International Journal of Mass Spectrometry and Ion Processes, vol. 123, pp. 43–47, 1993.

Marshall, Alan G. and Schweikhard, Lutz. Fourier transform ion cyclotron resonance mass spectrometry: technique developments. International Journal of Mass Spectrometry and Ion Processes, vol. 118/119, pp. 37–70, 1992.

Marto, Jarrod A., Marshall, Alan G. and Schweikhard, Lutz. A two-electrode ion trap for Fourier transform ion cyclotron resonance mass spectrometry. International Journal of Mass Spectrometry and Ion Processes, vol. 137, pp. 9–30, 1994.

Nikolaev, E.N., Frankevich, V.E. and Aberth, W. The resolution obtained from low energy ion scattering using an ion cyclotron resonance spectrometer. International Journal of Mass Spectrometry and Ion Processes, vol. 130, pp. 9–14, 1994.

Sugihara, Ryo and Yamanaka, Kaoru. Nonlinear Ion Cyclotron Resonance in Electromagnetic Wave with Non-Uniform Amplitude. Journal of the Physical Society of Japan, vol. 63, No. 12.pp. 4386–4395, Dec. 1994.

Wang, Mingda and Marshall, Alan G. Laboratory-Frame and Rotating-Frame Ion Trajectories in Ion Cyclotron Resonance Mass Spectrometry. International Journal of Mass Spectrometry and Ion Processes, vol. 100, pp. 323–346, 1990.

Xiang, Xinzhen, Grosshans, Peter B. and Marshall, Alan G. Image charge-induced ion cyclotron orbital frequency shift for orthohombic and cylindrical FT-ICR ion traps. International Journal of Mass Spectrometry and Ion Processes, vol. 125, pp. 33–43, 1993.

Fuerstenau, Stephen D. and Benner, Henry W. Mollecular Weight Determination of Magadalton DNA Electrospray Ions Using Charge Detection Time-Of-Flight Mass Spectrometry. Rapid Communication in Mass Spectrometry, vol. 9, pp. 11528–11538, 1995.

IONS
SAMPLE
DETECTOR
x
y
$E_r$
$E_z$
10
11
12
14
16
18
20
22
24
26
28
30
32
34
36
38
40
42
44
46
48
50
52
54
56
58
1B

ROTATING FIELD MASS AND VELOCITY ANALYZER

This is a continuation of application Ser. No. 08/694,850, filed Aug. 9, 1996, now abandoned.

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The present invention relates to mass spectrometers, and in particular to a mass and velocity analyzer utilizing a rotating radio frequency (RF) field for identifying mass and velocity distributions in ion beams.

2. Related Art

Atoms and molecules present in a sample are converted into ions and introduced into a mass spectrometer where the ionic species are separated according to their mass-to-charge (m/e) ratio. A charged-particle detector located at the exit of the mass spectrometer counts the separated ions in order to identify the mass and velocity distribution in the ion beam. In situations where the ion velocity or energy distribution of a collection of ions are well known (or constant), the device provides a novel and direct mean of obtaining a mass spectrum measurement. Information useful in determining the chemical composition of the sample can be determined.

One type of mass spectrometer, the magnetic sector analyzer, utilizes a magnetic field to mass select ions generated from a sample. A gas, liquid, or solid sample is first converted via conventional ion source methods into a beam of singly-charged ions. After the ions are accelerated by electrostatic field, a magnetic field is used to deflect the ions, with the amount of deflection inversely proportional to their mass. A detector after the magnetic field is used for counting the ions of a certain specific mass (when using a single detector), or mass range (when using an array detector). The position of the mass peaks on the detector with respect to magnetic field intensity or ion energy gives the mass distribution in the original ion beam.

Other mass spectrometers (such as the quadrupole mass spectrometer) utilize electric fields rather than magnetic fields. As shown in FIGS. 1A and 1B, the quadrupole mass spectrometer 10 separates ions 11 of an ion beam 12 with different masses by applying DC (direct current) and RF (radio frequency) electric fields on four cylindrical rods 14, 16, 18, 20. Opposite rods have identical potentials, with a potential 22, 26 in one opposing pair of rods 14, 18 being the negative of a potential 24, 28 on the other pair of rods 16, 20.

The potentials 22, 24, 26, 28 in the quadrupole 10 are a quadratic functions of the coordinates. The four rods 14, 16, 18, 20 each may have a hyperbolic or circular cross section and the applied electric potentials on each rod add to form an electric "saddle potential" located on an inside region 30 of the rods. The ion beam 12 enters the inside region 30 of the quadrupole in the direction indicated by arrow 32 through an aperture 34 of the inside region 30. As the ions 11 travel in a lengthwise direction, they either collide with an ion detector 36 or deflect away (as indicated by arrow 38) from the ion detector 36. Whether the ions collide with or deflect away from the ion detector 36 is dependent on the RF and DC electric fields and ion mass.

For a quadrupole, the ultimate mass resolution depends on the accurate placement of apertures 34, the accurate positioning and shaping of the rods 14, 16, 18, 20 and the magnitude of an accurate and stable RF/DC voltage ratio.

However, many current mass spectrometers are not amenable to the next generation of millimeter and sub-millimeter-sized spectrometers. Such miniaturized and micromachined instruments are needed in the domestic sector for use in pollution monitoring in factories, homes, auto exhausts, etc.; in laboratories for residual gas analysis and plasma processing; and on spacecraft for low-mass, low-power investigations of planetary environments. Current spectrometers either utilize magnetic fields (magnetic sector analyzers) and require bulky magnets and shielding; or they require the precise (0.1% tolerances) machining and placement of rods (quadrupole analyzer). As the size of devices decreases, the manufacturing precision required can approach the micron- and sub-micron level, which presents a formidable manufacturing challenge.

Therefore, what is needed is a mass or velocity analyzer which is amenable to miniaturization to sub-millimeter dimensions. Such a spectrometer should also be capable of maintaining respectable ion mass resolution without requiring 0.1% dimensional tolerances, such as required in the case of the quadrupole mass spectrometer.

SUMMARY OF THE INVENTION

To overcome the limitations in the prior art described above, and to overcome other limitations that will become apparent upon reading and understanding the present specification, the present invention is a rotating field mass and velocity analyzer. This invention includes a cell with four walls, or two consecutive cells, each with two walls, orthogonally oriented. Time-dependent alternating RF potentials are applied to each wall. Detection is by means of a channel-type multiplier, microchannel plate, charge-coupled device, or a simple shielded metal cup (so-called Faraday cup).

The RF potentials create crossed electric fields in the cell. Since these crossed RF fields are time dependent, their net effect is to generate RF fields which effectively "rotate" within the cell. An ion beam is accelerated into the cell and the rotating RF field disperses the incident ion beam according to the mass and velocity distribution present in the ion beam. The ions of the beam either collide with the ion detector or deflect away from the ion detector, depending on the RF amplitude and frequency selected, and the ion m/e. The detector counts the impinging ions to determine the mass and velocity distribution in the ion beam. From this, the chemical composition of the sample can be determined.

In a second embodiment, a second detector is located at the bottom of the cell. In a third embodiment, cells are made with only two walls, instead of four walls, which helps to decrease size and costs of manufacture. In another embodiment, as described in greater detail below, the crossed RF fields are both in phase.

This invention employs two time dependent, harmonic but spatially invariant "dipole" fields rather than quadrupole fields found in a conventional quadrupole mass spectrometer. A novel feature of this characteristic is that time dependent dipole fields radiate less power (hence consume less power) at a given RF frequency than comparable quadrupole fields operating at that same frequency.

Another feature of the present invention is the use of dynamic-trapping electric fields which disperse the ions, rather than magnetic fields. Thus, large bulky magnets are not needed. Finally, the present invention does not require that apertures and deflecting elements be precisely machined or aligned. Thus manufacturing of the present invention requires much less precision micromachining than a comparable sized miniature quadrupole analyzer, for example. As a result, the present invention is easier to build and operate and can be easily miniaturized.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figures 1A, 1B, 2A, 2B:
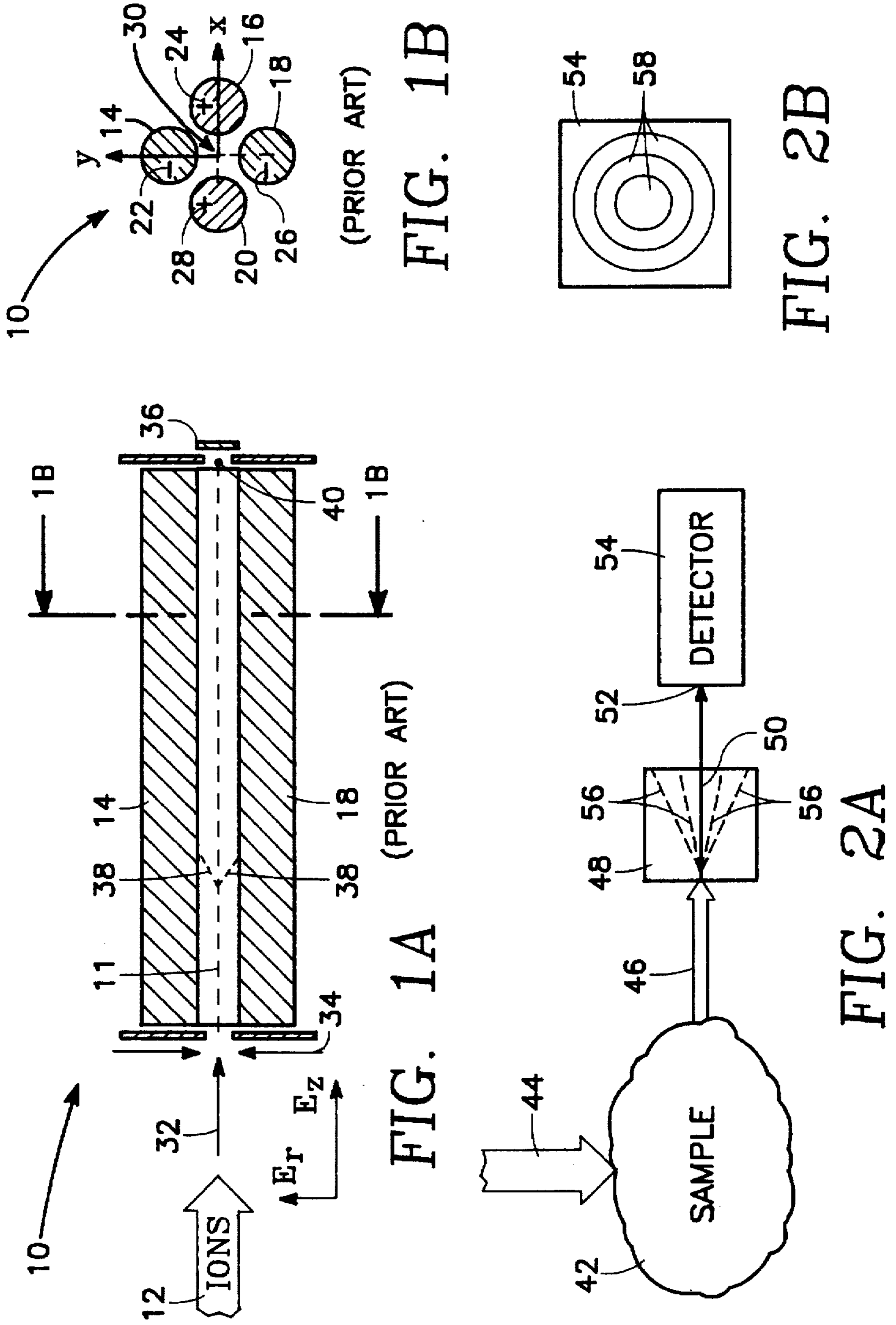
FIG. 1A (PRIOR ART)
FIG. 1B (PRIOR ART)
FIG. 1A is a side cross sectional view of a quadrupole mass spectrometer of the prior art.
FIG. 1B is a front cross sectional view of a quadrupole mass spectrometer of the prior art.
FIG. 2A is an overall block diagram of the present invention.
FIG. 2B is a front view of the detector of FIG.2A of the present invention.

FIG. 2A is an overall block diagram of the present invention. A sample 42 is ionized by an ionizer 44, which may use field emission, field ionization methods, or can be an electrospray nozzle for example. Ionization of the sample produces a plasma or an ion beam 46 consisting of singly charged ions. The ions are accelerated and focused using conventional lensing procedures.

Next, the ion beam 46 is introduced into a mass and velocity analyzer 48 of the present invention. Analyzer 48 has a time dependent dipole RF rotating electric field 50. The rotating RF field 50 disperses the ions of the incident ion beam 46 according to the mass and velocity distribution present in the ion beam 46. Collision with or deflection away from the ion detector 54 is dependent on the RF rotating field 50 and the masses of the ions in the ion beam 46. This causes certain ions 52 of the ion beam 46 to collide with an ion detector 54 and other ions 56 to deflect away from the ion detector 54. The detector 54 counts the ions 52 to simultaneously determine the mass and velocity distribution in the ion beam 46.

Velocity is determined by simple particle drift in the direction the ion beam is traveling. Mass is selected by the spatial extent of the ion signal impinging on the detector 54 as a function of RF frequency and RF amplitude. In general, as shown in FIG. 2B, ions of a given mass form circles or ring patterns 58 on the 2-D detector 54. Each ring of the ring pattern 58 has a radius that directly depends on the ion m/e and RF amplitude. A detailed description of the rotating field mass and velocity analyzer 48 of the present invention will be discussed in detail below and shown in FIGS. 3–11.

Component Description

Figure 3:
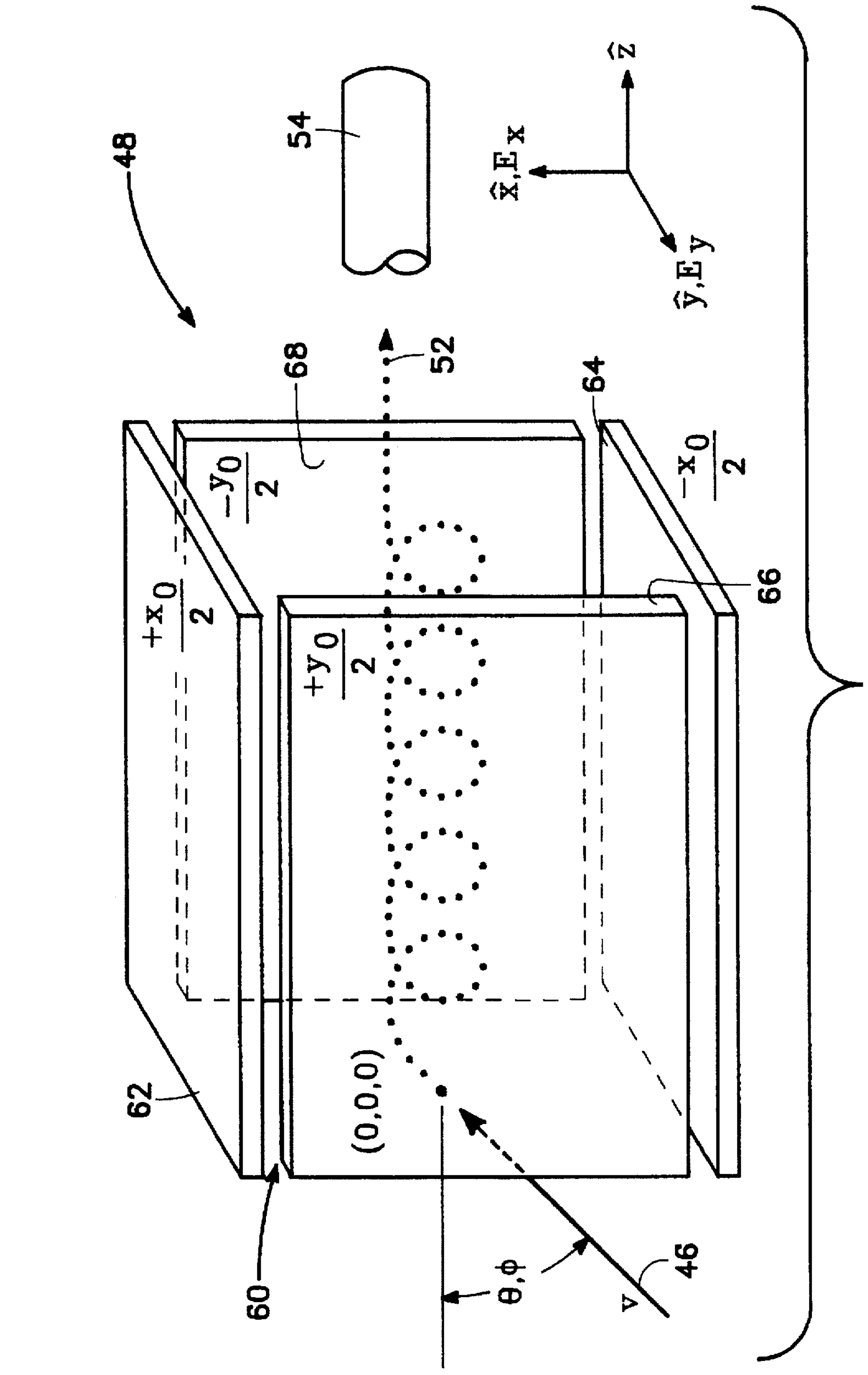
FIG. 3 is a perspective view of a preferred embodiment of the rotating field mass and velocity analyzer of the present invention.

FIG. 3 is a perspective view of a preferred embodiment of the rotating field mass and velocity analyzer of the present invention. The rotating field mass and velocity analyzer 48 includes a rectangular cell 60 comprising four walls or plates 62, 64, 66, 68, and a charged particle detector 54 located at the end of the cell 60 in the x-y plane. The four walls or plates comprise a top wall 62, a bottom wall 64, a front wall 66, and a back wall 68. The detector 54 is preferably a two-dimensional (2D) array detector, such as a resistive anode microchannel plate or a charge coupled device (CCD). The cell 60 is adapted to receive most ion beam 46 samples from conventional means.

Figure 4:
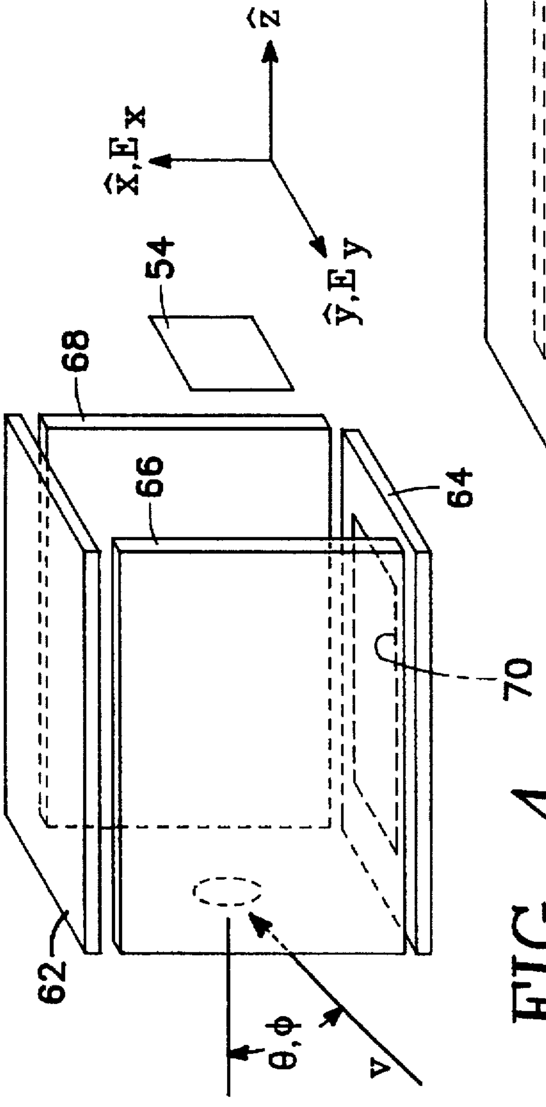
FIG. 4 is a perspective view of a second embodiment of the rotating field mass and velocity analyzer of the present invention with a second detector.

FIG. 4 is a perspective view of a second embodiment rotating field mass and velocity analyzer of the present invention with a second detector. In addition to the detector 54 of FIG. 3 located at the end of the cell 60 in the x-y plane, a second detector 70 can also be located at the bottom of the cell 60 in the y-z plane adjacent to the bottom wall 64. The second detector 70 provides an alternate detection scheme for accurately determining the mass and velocity distribution in the ion beam 46. The second detector 70 is preferably a two-dimensional (2D) array detector, such as detector 54 described above.

General Operation

Figure 5:
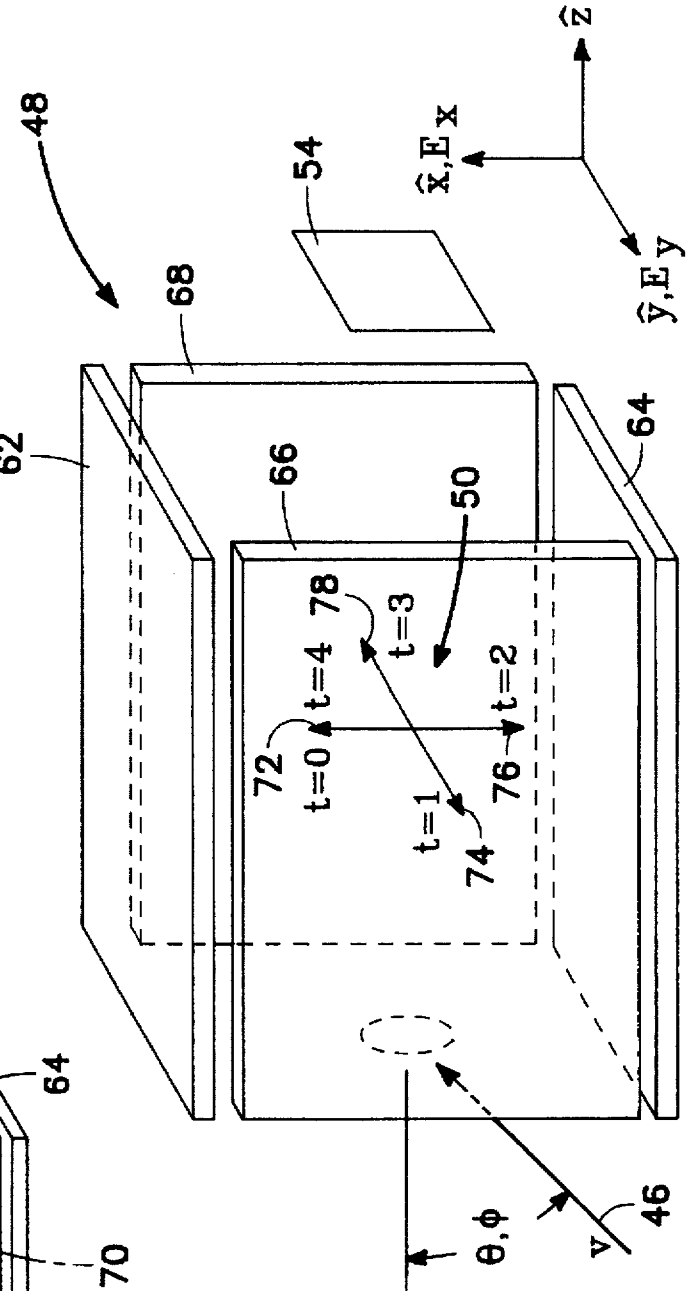
FIG. 5 is a perspective view of the rotating RF electric fields of the mass and velocity analyzer of the present invention.

FIG. 5 is a perspective view of the rotating electric fields of the mass and velocity analyzer of the present invention. The overall electric fields near the axis of the cell 60 are spatially uniform. Adjacent walls have time dependent electric potentials which generate crossed fields (sinusoidal, with frequency ω) located in the x and y directions, respectively. The respective crossed fields are generated by four time dependent RF electric potentials on the four walls of the cell 60 (one RF field per two walls).

Specifically, a first RF field is generated in the x direction by the RF potentials applied to the top wall 62 and the bottom 64. A second RF field is generated in the y direction by the RF potentials applied to the front wall 66 and the bottom wall 68. Both RF fields are applied orthogonally to the incident direction (along a z axis) of the ion beam. The first and second crossed RF fields differ in phase by $\pi/2$ radians. This arrangement creates the rotating RF field.

The top wall 62 has a $+V_x^o/2$ potential, the bottom wall 64 has a $-V_x^o/2$ potential, the front side wall 66 has a $+V^o_y/2$ potential, and the back side wall 68 has a $-V_y^o/2$ potential. To illustrate the rotation of the field, four different situations in time are labeled t=0,1,2,3, where the units of time are arbitrary (for example, microseconds). At time t=0, the first RF field is generated in the direction indicated by arrow 72. At time t=1, the second RF field is generated in the direction indicated by arrow 74, and the length of arrow 72 has shrunk to zero. Similarly, at t=2 and t=3, the first and second RF fields are generated in the direction indicated by arrows 76, 78 respectively. At t=4, the first RF field is once again in the direction indicated by arrow 72. The time-dependent alternating pattern of the crossed RF fields 72, 74, 76, 78, effectively creates a rotating RF field 50.

For instance, in the example shown in FIG. 5, transition from the first RF field (indicated by arrow 72) to the second RF field (indicated by arrow 74) during the time interval from t=0 to t=1 creates 90 degrees of rotation of the RF fields. Similarly, transition from the second RF field (indicated be arrow 74) to the third RF field (indicated by arrow 76) during the time interval from t=1 to t=2, transition from the third RF field (indicated by arrow 76) to the fourth RF field (indicated by arrow 78) during the time interval from t=2 to t=3, and transition from the fourth RF field (indicated by arrow 78) to the first RF field (indicated by arrow 72) during the time interval t=3 to t=4 each creates 90 degree rotation.

As a result, complete 360 degrees of rotation of the RF fields is accomplished. Thus, within the cell 60, the RF field 50 continuously rotates in a circular motion orthogonally incident to the ion beam 46. It is important to note that the above steps in time can represent any time value or any RF frequency.

Figure 8:
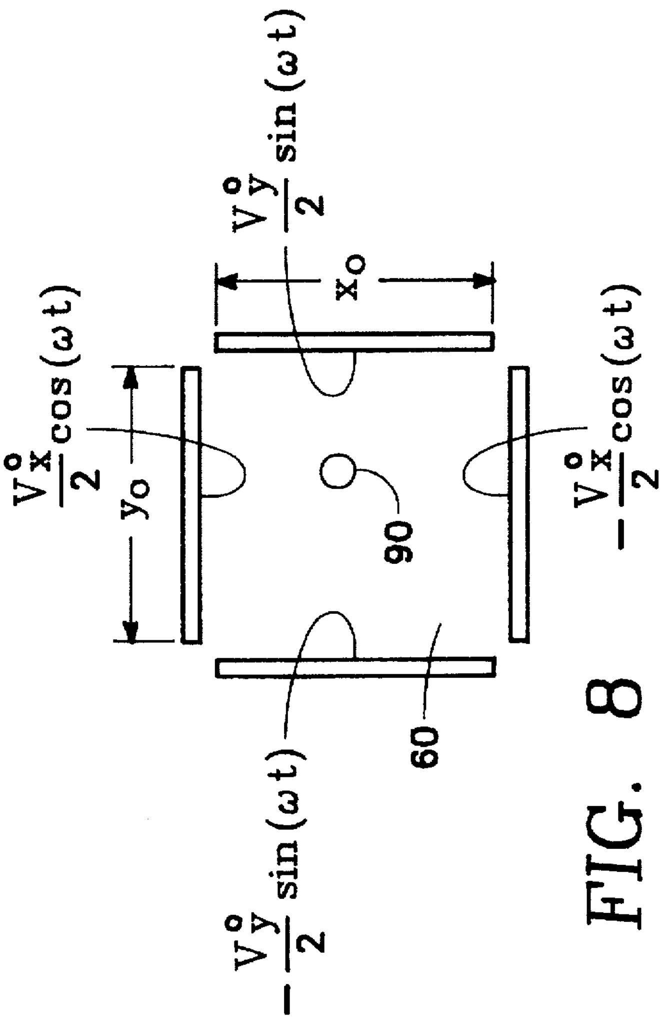
FIG. 8 is a cross sectional side view illustrating a computer trajectory of on resonance ions within the cell of the mass and velocity analyzer of the present invention.

FIG. 8 is a computer simulation and cross sectional front view of the rotating field mass and velocity analyzer of FIG. 5. The ions 52 with the certain selected m/e in the ion beam 46 follow the path of the circularly rotating RF fields 50. In addition, the forward velocity of the ion beam 46 forces traversal of the ions 52 with the certain mass along the z axis in the direction indicated by arrow 81 until they reach the detector 54. Referring back to FIGS. 3 and 5 along with FIG. 6, because the ions 52 follow the circular path of the RF fields 50, the ions 52 traverse along the z axis in a helical motion as indicated by FIG. 6.

Equations of Motion and RF Selection for Detailed Operation

The following is a detailed description of the ions' equations of motion and details on RF amplitude and frequency selection. As generally discussed above, the RF frequency ω and amplitude $V_o^y$ determine the particular ion mass to charge ratio (m/e) to be selected. The frequency and amplitude can be ramped to cover ion masses ranging from 1 to 300 amu or higher. Ions of a given m/e move in a helix pattern generated by the rotating Rf field, traverse along the z axis, and ultimately reach the detector. However, ions not having the proper m/e deflect away from rotating RF field and never reach the detector. The distribution of ions hitting the detector at the end of the cell correspond to an m/e ratio that can be defined by certain equations of motions.

Figure 6:
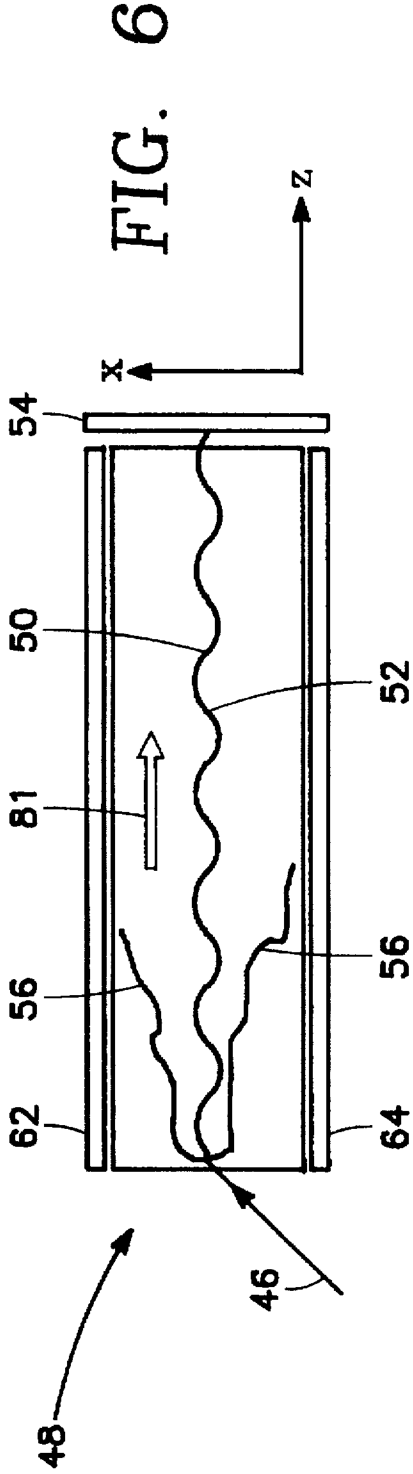
FIG. 6 is a cross sectional front view of the rotating field mass and velocity analyzer of FIG. 5.

Referring back to FIG. 3 along with FIGS. 5–6, the ions are introduced into a region of crossed RF electric fields expressed as $\vec{E}_x(\omega,t)$ and $\vec{E}_y(\omega,t)$ in the x and y directions, respectively. The cell 60 has interior dimensions $x_o, y_o, z_o$ and the incident ions 46 enter the cell 60 at the origin (x,y,z)=(0,0,0). The following expressions can be given for the electric fields inside the cell:

$$E_x(\omega,t)=\frac{V_o\cos(\omega t)}{x_o}\ \text{across walls 62 and 64} \tag{1a}$$

$$E_y(\omega,t)=\frac{V_o\sin(\omega t)}{y_o}\ \text{across walls 66 and 68} \tag{1b}$$

$$E_z=0 \tag{1c}$$

The expressions in (1*a*), (1*b*) and (1*c*) are simplified in that they do not include fringing fields encountered when an ion first enters the cell from a region of grounded potential (for example), or when the ion approaches the edges of the walls where the walls of different potential are close to one another. However, for all cases the exact fields can be numerically computed and trajectories accurately calculated using standard fields-and-trajectories computer codes. One such commercially-available, accurate computer simulation code (SIMION) has been developed at the Idaho National Engineering Laboratory by D. A. Dahl and J. E. Delmore (INEL Report No. EGG-CS-7233, Rev. 2).

The ion beam 46 with velocity v is initially directed into the cell 60 entrance aperture at polar launch angles θ and ϕ, as shown in FIG. 5. The incoming ion beam 46 experiences fringing fields as it enters the cell 60. However, fringing in the x and y directions are neglected in the present disclosure because they can be made small, usually by proper focusing. At sufficiently far distances from the cell 60, the electric potential resembles two time-dependent dipole terms. Inside the cell 60, the fields are as given above in expressions 1(*a*), 1(*b*), and 1(*c*). Determination of the electric fields at intermediate distances from the outside of the cell 60 can be solved with the Laplace equation using the method of separation of variables, and is described in detail in *Classical Electrodynamics, 2nd Edition*, by J. D. Jackson, John Wiley & Sons, New York (1975), pp. 69–71.

If fringing is neglected at the entrance of the cell 60 and at the walls of the cell 60, the electric field of the cell 60 can be expressed as the sum $E_x(\omega,t)+E_y(\omega, T)$ of the two orthogonal oscillating dipole terms, each given by $$E_x(\omega t)=\frac{V_x^o}{x}\cos\omega t \tag{2a}$$

$$E_y(\omega t)=\frac{V_y^o}{y}\sin\omega t \tag{2b}$$

where t is the time and ω=2πf is the angular frequency. The corresponding equations of motion in the x, y, and z directions are then $$\frac{d^2x}{dt^2}=\left(\frac{e}{m}\right)E_x(\omega,T)=\left(\frac{e}{m}\right)\frac{V_x^o}{x_o}\cos\omega t, \tag{3a}$$

$$\frac{d^2y}{dt^2}=\left(\frac{e}{m}E_y(\omega,t)=\left(\frac{e}{m}\right)\frac{V_y^o}{y_o}\sin\omega t,\right. \tag{3b}$$

$$\frac{d^2z}{dt^2}=0. \tag{3c}$$

These equations can be integrated once to give the x, y, and z velocities inside the cell, and twice to give the x, y, and z positions. Simple integrations between the lower and upper limits $\omega t_o$ and $\omega t$, respectively, can be carried out to give the final positions as $$x(T)/\lambda_x = \cos \omega t_o - \cos \omega(T+t_o) - \omega T \sin \omega t_o, \quad (4a)$$

$$y(T)/\lambda_y = \sin \omega t_o - \sin \omega(T+t_o) + \omega T \cos \omega t_o \quad (4b)$$

$$z(T) = v_z^o T. \quad (4c)$$

Here, T is the time the ion spends in the dipole fields, and $t_o$ is the ion's time of arrival at the entrance aperture relative to the phase of the rf field. The assumption of zero velocity perpendicular to the axis (x, y directions) has been made for simplicity. The initial x, y, and z velocities can be calculated by $$\left(\frac{dx}{dt}\right)^o = v_x^o = v\sin\theta\cos\phi \quad (5a)$$

$$\left(\frac{dy}{dt}\right)^o = v_y^o = v\sin\theta\sin\phi \quad (5b)$$

$$\left(\frac{dz}{dt}\right)^o = v_z^o = v\cos\theta \quad (5c)$$

where v is the incident ion velocity.

Figure 7A:
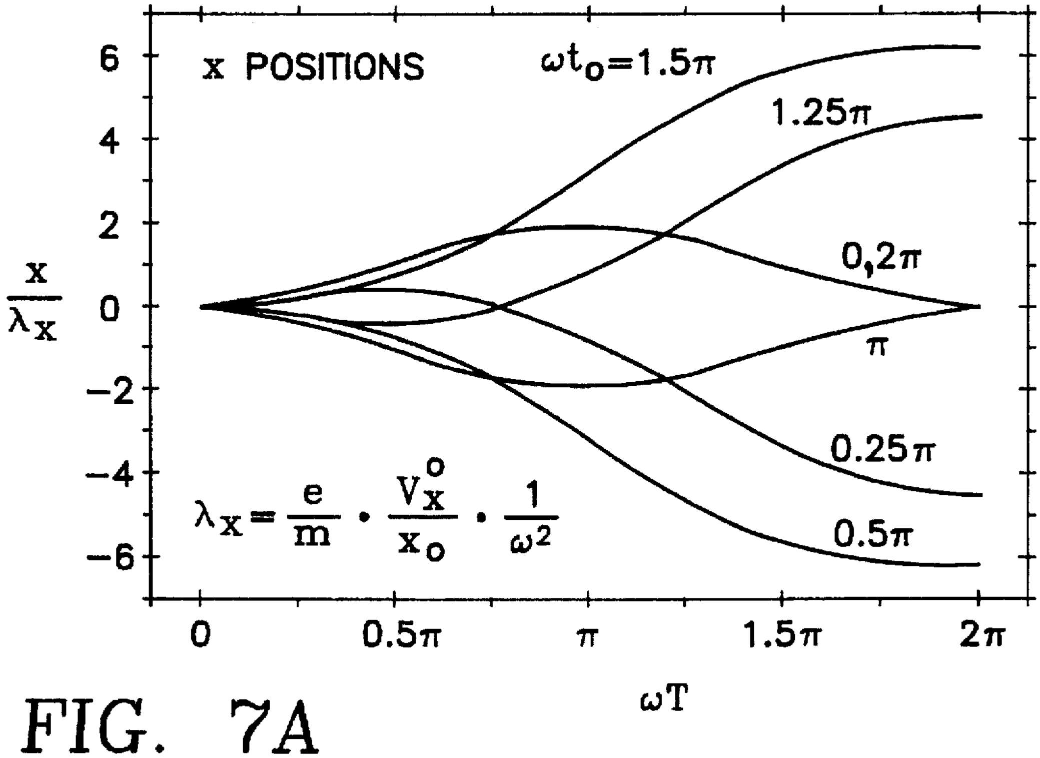
FIG. 7A is the result of a theoretical output illustrating the path (x positions) of the ion beam through the rotating x,y RF fields of the cell in the present invention.
Figure 7B:
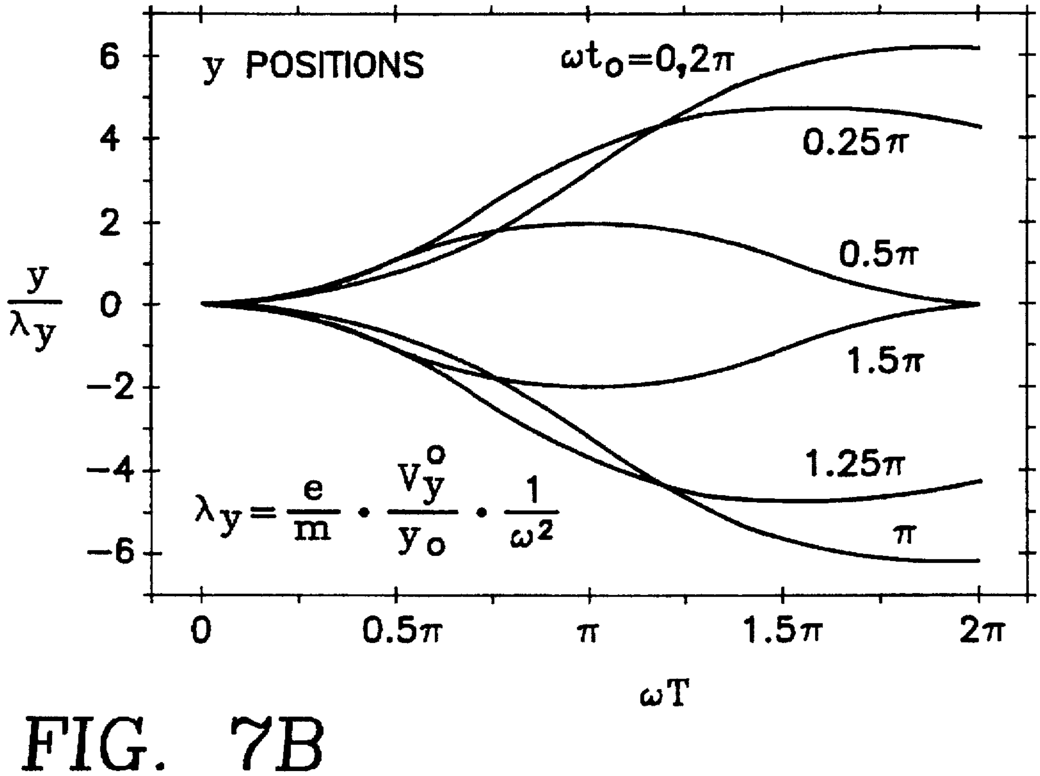
FIG. 7B is the result of a theoretical output illustrating the path (y positions) of the ion beam through the rotating x,y RF fields of the cell in the present invention.

The quantities $$\lambda_x = \frac{e}{m}\left(\frac{V_x}{\omega^2 x_o}\right)$$

and $$\lambda_y = \frac{e}{m}\left(\frac{V_y}{\omega^2 y_o}\right)$$

are scaling parameters which describe the amplitude of ion motion between the walls. This amplitude is seen to be linearly proportional to the mass-to-charge ratio (m/e), electric fields ($V_x^o/x_o$, $V_y^o/y_o$), and inversely proportional to $\omega^2$. The importance of the RF phase $\omega T$ relative to the ion arrival time $\omega t_o$ is illustrated in FIGS. 7A and 7B. The variation of the ion's deflection in the x- and y- direction is shown in FIGS. 7A and 7B, respectively. It is noted that particles which exit the x-plate are undeflected at $\omega t_o=0$, $\pi$, and $2\pi$, and are the most deflected at $\omega t_o=0.5\pi$ and $1.5\pi$. The opposite is true for the y-plate. The output pattern can be seen at the plane of the detector 54 by defining the incident particle velocity, then "tuning" the RF angular frequency so that $\omega T=2\pi$ for that incident particle velocity. In this case, a simple expression can be obtained as $$\frac{x^2(T)}{\lambda_x^2} + \frac{y^2(T)}{\lambda_y^2} = 1. \quad (6)$$

Hence, the locus of points at detector 54 is a circle for each m/e. This is the ion analogue to the familiar Lissajous figures made with electrons and the deflection plates of an oscilloscope. The figure could be detected by an area detector, such as a microchannel plate or a charge-coupled device. The resolution of the device, or separation between adjacent m/e, will depend on the input aperture diameter, angular width of the incident beam, plate alignment, and homogeneity (fringing) of the fields. Some of these effects can be obtained by taking suitable differentials of Eqs. (4a) and (4b).

The importance of the RF phase angle is now addressed. Referring back to FIGS. 3–6, if the launch angle θ is non-zero, then a correct velocity (unique speed and direction) is required so that the ion 52 of a certain m/e traverses the length of the cell 60 and does not drift into one of the side walls. Also, assuming the ion beam 46 produces singly-charged ions of constant energy, then both the velocity information and the mass selection can be uniquely determined by tuning the RF frequency, and detecting the appropriate pattern at the detector 54.

For a non-zero launch angle θ the ideal velocity depends on what point in the RF cycle (the phase angle) the ion beam 46 enters the cell 60. This allows for higher mass resolution than that obtained for the zero launch angle case above. Only a small segment in "phase-space" allows for transmission of a selected mass through the cell 60. This is analogous to the defining apertures used in the conventional quadrupole mass spectrometer. In the quadrupole of FIG. 1, the aperture 34, along with the RF fields, aid in selecting the ion mass by limiting the geometrical (spatial x-y) extent of the incident ion beam. In contrast, in the present invention of FIGS. 2–9, apertures only partially align and spatially limit the incoming ion beam 46. Additional limitation in selecting an ion with a given mass occurs in frequency space as well.

The equations 4(a)–4(c) and the on-axis trajectories in FIGS. 7A and 7B describe the basic motion of the ions in the absence of fringing fields. To include the effects of fringing, the three-dimensional SIMION field-and-trajectories code can be used to calculate trajectories for ions traveling in the oscillating fields.

FIG. 8 shows a computer-simulated ion path through the RF fields of the cell in the example of FIG. 6. It should be noted that the numerical solutions closely agree with the simple analytic expressions 4(a)–4(c) for paths near the central region of the cell. In general, each ion of particular m/e will either drift into the side walls of the cell 60, or impinge the detector 54 at a unique locus. Each m/e ion that reaches the detector will describe either an elliptical or circular pattern (equation 6), and the spacing between the ellipses or circles (the resolution for consecutive m/e) will depend upon the magnitude of the parameters $\lambda_x$ and $\lambda_y$.

Figure 9:
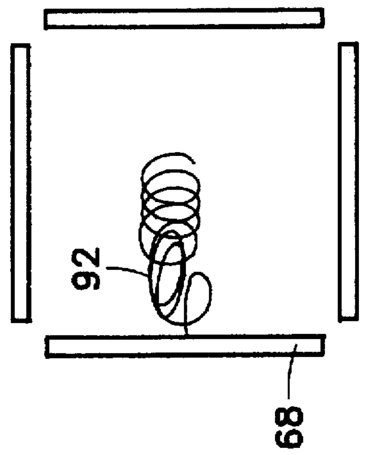
FIG. 9 is a cross sectional side view illustrating a computer trajectory of off-resonance ions within the cell of the mass and velocity analyzer of the present invention.

For example, referring to FIGS. 3–6 along with FIGS. 8–9, FIG. 8 shows an on-resonance condition where a particular mass of 100 amu was selected and the ion 52 with the 100 amu mass traverses in a helical path 90 guided by RF fields toward the detector 54. FIG. 9 shows an off-resonance condition where a mass of 70 amu traverses a non-circular path 92 and RF field path 50 forces a drifting motion into one of the side walls 68 and not into the detector 54.

In both simulations, the ions were traveling with 10 eV kinetic energy at an entry angle θ=40°. The RF potential applied to the side walls had an amplitude of 70 volts and frequency ω=2.8 MHz. If the cell 60 is miniaturized to approximately 1 mm×1 mm×20 mm, then typical RF voltages are on the order of 15 volts and 2.2 MHz. These frequencies and voltages are easily generated with simple one "chip" electronics.

Figure 10:
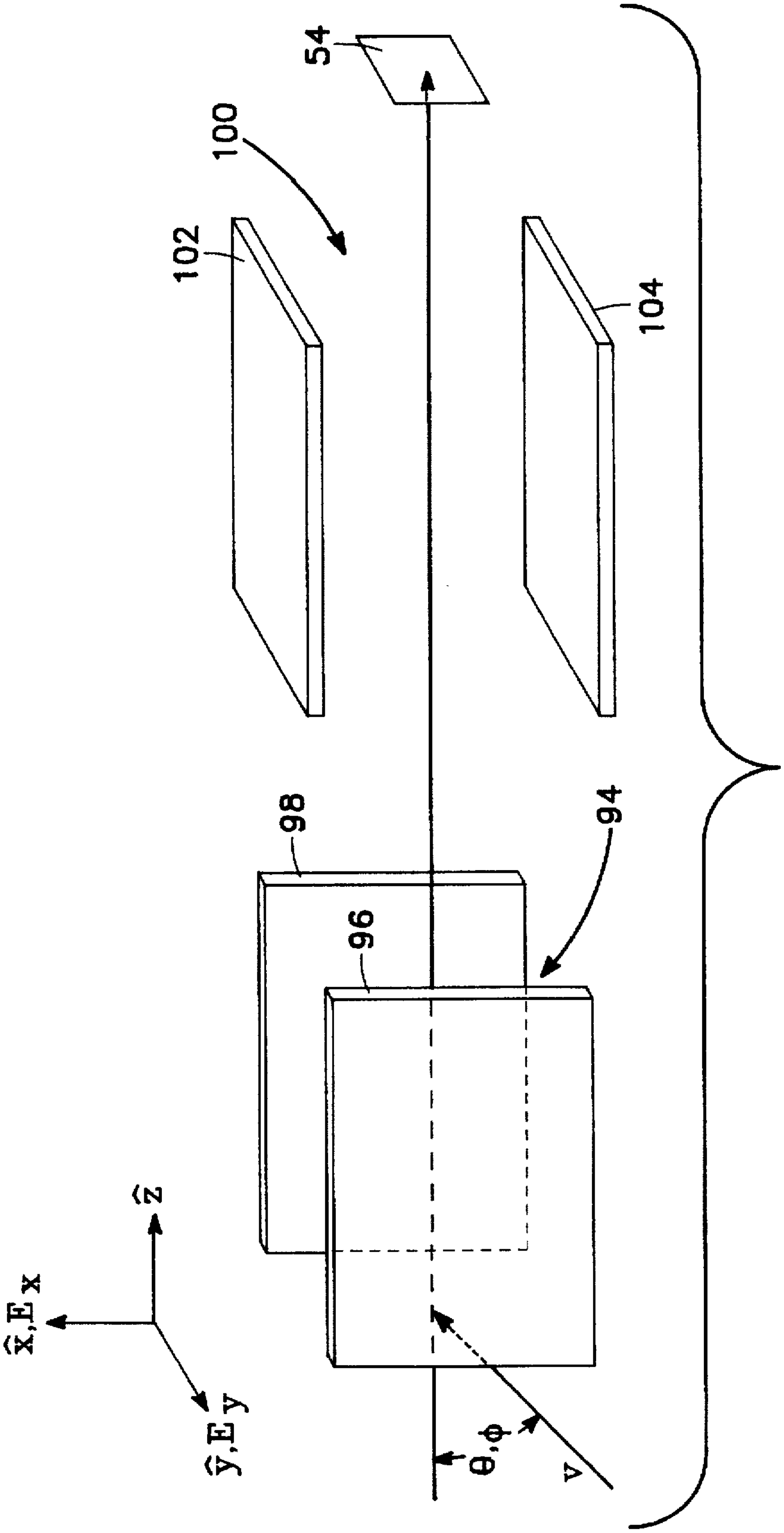
FIG. 10 is a third embodiment of the rotating field mass and velocity analyzer of-the present invention with two orthogonal one-dimensional rotating fields placed in series.
Figure 11:
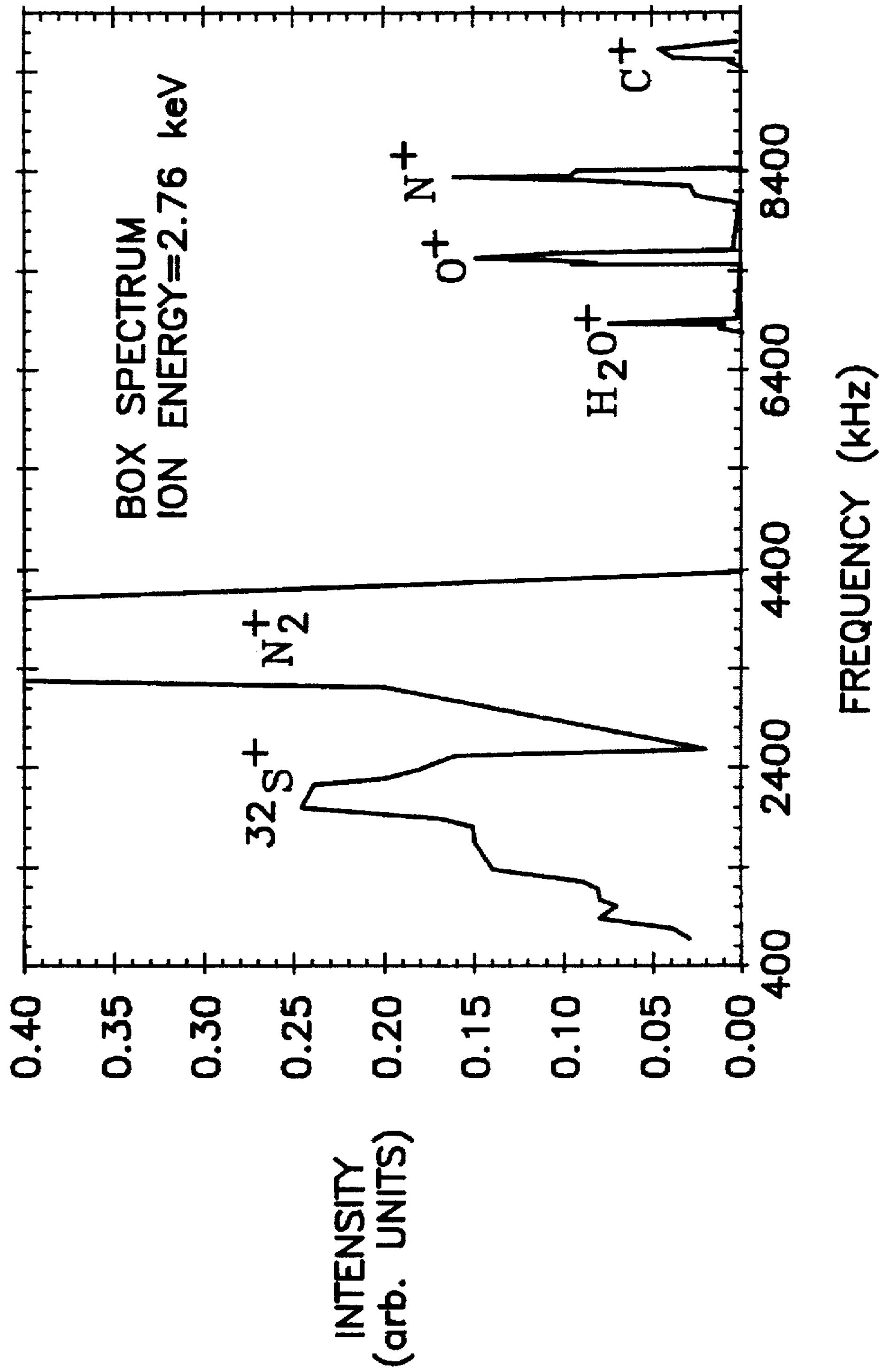
FIG. 11 is a graph comparing the intensity against the frequency for the rotating field mass and velocity analyzer of FIG. 3.

FIG. 10 is a perspective view of a third embodiment of the rotating field mass and velocity analyzer of the present invention with orthogonal deflection walls spaced apart, rather than forming a single box. This geometry has the advantage that the region of uniform (non-fringing) electric fields can be made large relative to the size of the deflected beam within the walls. A first cell 94 can be used with a front wall 96 and a back wall 98. A second cell 100 is placed in series with a top wall 102 and bottom wall 104. The operation of this embodiment is similar to that of FIG. 3, except that deflections occur by first a single RF field in the y-direction, followed by a single RF field in the x-direction. Similarly, deflection can be set to occur in only one dimension (x or y) in which case single set of walls (cell 94 or cell 100) can be used.

Although the accuracy of the mass and velocity distribution detected of the embodiment of FIG. 10 is reduced, less equipment is utilized. Thus, for mass and velocity distribution determinations that do not require greater accuracy and require more miniaturization and less equipment, the embodiment of FIG. 10 can be used.

The operation of the mass and velocity analyzer with two walls is very similar to the operation of the mass and velocity analyzer with four walls of FIG. 3. However, instead of two rotating RF fields, there is only one RF field rotating between the front wall 96 and the back wall 98.

Yet another embodiment of the invention is the case where the top and bottom walls 62, 64 and the front and back walls 66, 68 of FIG. 5 have RF potentials operating at the same phase angle. For example, the x direction and the y direction RF fields could be generated by potentials that are given by +Vo sin ωt or −Vo sin ωt.

Other Embodiments

In addition, the potentials of the walls of FIGS. 4–5 can be changed to alter the path of the rotating RF field 50. For example, two facing walls with the x-direction fields can both have $V_x^o$ cos (ωt) potentials and two facing walls with the y-direction fields can both have $V_{yo}$ cos (ωt) potentials. Thus, instead of a circular rotating RF field 50 as shown in FIGS. 4–5, an RF field would have a diagonal path back and forth between the corners of the cell 60. As a result, the ions 52 with a certain mass would travel in the diagonal path of the RF field. As can be seen, many different embodiments with different RF fields can be generated by altering the potentials on the walls and in the cell 60.

Experimental Results

Referring to FIG. 3, an important simplification occurs if the incoming ions of the ion beam have sufficiently small angular spread in θ and if θ approaches 0°. This is the case for a well defined ion beam traveling along the z-axis into the cell. The mass selection can be obtained with only one oscillating field, for example $E_x$. Ion motion oscillates in the same direction as the applied oscillating field. The derived mass spectrum as a function of frequency ω is shown in FIG. 12. This initial spectrum shows a resolution better than one part in 100.

Conclusion

Since the rotating field mass and velocity analyzer of the present invention uses rotating fields and does not require magnetic fields or apertures to be precisely aligned, the present invention is much easier to build and operate. Also, the present invention is a fraction of the size and mass of current magnetic field mass spectrometers. Manufacturing the present invention requires much less precision micromachining than a comparable sized miniature quadrupole analyzer.

Further, the present invention operates with substantially less power at a given RF frequency as compared to equivalent quadrupole mass spectrometers. This is because the present invention uses time-dependent dipole fields instead of quadrupole fields as in the quadrupole mass spectrometer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A mass analyzer for identifying mass and velocity distributions in an ion beam comprising:
   - a cell receiving said ion beam;
   - means for creating a rotating RF field imparting a non-magnetic field within said cell, wherein said cell is a magnetic field free cell; and
   - a detector located in close proximity to said cell for counting ions in said ion beam.

2. The mass analyzer as set forth in claim 1, wherein said rotating RF field is time dependent.

3. The mass analyzer as set forth in claim 1, wherein said detector is a Faraday cup.

4. The mass analyzer as set forth in claim 1, wherein said detector is a two-dimensional array detector.

5. The mass analyzer as set forth in claim 4, wherein said detector is a resistive anode microchannel plate.

6. The mass analyzer as set forth in claim 4, wherein said detector is a charge coupled device.

7. The mass analyzer as set forth in claim 1, further comprising a second detector located in close proximity to said cell for counting ions in said ion beam.

8. The mass analyzer as set forth in claim 1, further comprising an ionizer for ionizing said ion beam before said ion beam is received by said cell.

9. The mass analyzer as set forth in claim 8, wherein said ionizer is a field emission ionizer.

10. The mass analyzer as set forth in claim 8, wherein said ionizer is a field ionization ionizer.

11. The mass analyzer as set forth in claim 8, wherein said ionizer is an electrospray nozzle ionizer.

12. A mass analyzer for identifying mass and velocity distributions in an ion beam comprising:
   - a cell comprising at least two walls with time-dependent alternating RF potentials applied to each wall;
   - a rotating RF field imparting a non-magnetic field and located within the cell, wherein said cell is a magnetic field free cell;
   - a detector located at an end of said cell for counting ions in said ion beam.

13. The mass analyzer as set forth in claim 12, further comprising a second detector located at a bottom of said cell for counting ions in said ion beam.

14. The mass analyzer as set forth in claim 12, wherein said rotating RF field is time dependent.

15. The mass analyzer as set forth in claim 12, wherein said detector is a charged-particle detector.

16. A mass analyzer for identifying mass and velocity distributions in an ion beam comprising:
   - first and second consecutive cells, each having two walls orthogonally oriented;
   - time-dependent alternating RF potentials applied to each wall, wherein said RF potentials create crossed electric fields within each cell to generate a non-magnetic rotating RF field within each cell, wherein said cell is a magnetic field free cell;
   - a detector located at an end of said cells for counting ions in said ion beam.

17. The mass analyzer as set forth in claim 16, further comprising a second detector located at a bottom of one cell of said cells for counting ions in said ion beam.

18. The mass analyzer as set forth in claim 16, wherein said crossed RF fields are both in phase.

19. The mass analyzer as set forth in claim 16, further comprising a second detector located at a bottom of one cell of said cells for counting ions in said ion beam.

20. The mass analyzer as set forth in claim 16, wherein said rotating RF field is time dependent.

21. The mass analyzer as set forth in claim 16, wherein said detector is a charged-particle detector.

22. A method for identifying mass and velocity distributions in an ion beam projected into a cell with at least two walls, comprising the steps of:
   - applying time-dependent alternating RF potentials to each wall of the cell to create crossed electric fields in the cell;
   - generating non-magnetic rotating RF fields within the cell, wherein said cell is a magnetic field free cell;

accelerating the ion beam into the cell;

dispersing the ion beam according to the mass and velocity distribution present in the ion beam by the rotating RF field; and counting ions in said ion beam.

23. The mass analyzer as set forth in claim 22, wherein the step of dispersing the ion beam further comprises the step of selecting an RF amplitude and a frequency of the RF potentials to thereby force the ions of the ion beam to either collide with the ion detector or to deflect away from the ion detector.

24. The mass analyzer as set forth in claim 22, wherein the step of applying time-dependent alternating RF potentials to each wall of the cell creates crossed RF fields that are both in phase.

* * * * *